United States Patent
Pearson (10) Patent No.: US 10,021,409 B2
(45) Date of Patent: Jul. 10, 2018

(54) APPARATUSES AND METHODS FOR ESTIMATING BITSTREAM BIT COUNTS

(75) Inventor: Eric C. Pearson, Conestogo (CA)

(73) Assignee: INTEGRATED DEVICE TECHNOLOGY, INC., San Jose, CA (US)

(*) Notice: Subject to any disclaimer, the term of this patent is extended or adjusted under 35 U.S.C. 154(b) by 821 days.

(21) Appl. No.: 13/467,624

(22) Filed: May 9, 2012

(65) Prior Publication Data

US 2013/0301699 A1 Nov. 14, 2013

(51) Int. Cl.
| | |
|---|---|
| H04N 7/26 | (2006.01) |
| H04N 19/436 | (2014.01) |
| H04N 19/15 | (2014.01) |
| H04N 19/176 | (2014.01) |
| H04N 19/13 | (2014.01) |
| H04N 19/149 | (2014.01) |
| H04N 19/91 | (2014.01) |
| H04N 19/40 | (2014.01) |
| H04N 19/194 | (2014.01) |

(52) U.S. Cl.
CPC ........... *H04N 19/436* (2014.11); *H04N 19/13* (2014.11); *H04N 19/149* (2014.11); *H04N 19/15* (2014.11); *H04N 19/176* (2014.11); *H04N 19/194* (2014.11); *H04N 19/40* (2014.11); *H04N 19/91* (2014.11)

(58) Field of Classification Search
CPC .. H04N 7/26; H04N 7/32; H04N 7/12; H04N 19/00472; H04N 19/91; H04L 9/08
USPC ............. 375/240.03, 240.12, 240.16, 240.24
See application file for complete search history.

(56) References Cited

U.S. PATENT DOCUMENTS

| | | | |
|---|---|---|---|
| 7,525,456 B2 | 4/2009 | Watanabe | |
| 2001/0047517 A1* | 11/2001 | Christopoulos | G06T 1/00 725/87 |
| 2002/0152317 A1* | 10/2002 | Wang | H04N 21/234354 709/231 |

(Continued)

FOREIGN PATENT DOCUMENTS

| | | |
|---|---|---|
| EP | 1545133 A2 | 6/2005 |
| EP | 2009034349 A1 | 7/2009 |

(Continued)

OTHER PUBLICATIONS

International Search Report and Written Opinion for Appl No. PCT/US2013/040308, dated Oct. 1, 2013.

(Continued)

*Primary Examiner* — Kate Luo
(74) *Attorney, Agent, or Firm* — Christopher P. Maiorana, PC (57) ABSTRACT

Examples of methods and apparatuses for estimating bit counts of a bitstream are described herein. An entropy encoder may include a bitstream encoding module and a bit count estimation module. The bitstream encoding module may be configured to encode a plurality of syntax elements according to a first encoding technique. The bit count estimation module may be configured to provide estimated bit counts for encoding the plurality of syntax elements according to a second encoding technique. In at least one embodiment, the bitstream encoding module may be further configured to encode the plurality of syntax elements based on the estimated bit counts.

20 Claims, 5 Drawing Sheets

(56) References Cited

U.S. PATENT DOCUMENTS

| | | | |
|---|---|---|---|
| 2005/0147172 A1* | 7/2005 | Winger | H03M 7/4006 375/240.23 |
| 2005/0232497 A1* | 10/2005 | Yogeshwar | H04N 19/56 382/232 |
| 2006/0165165 A1* | 7/2006 | Mohsenian | 375/240.03 |
| 2006/0176953 A1 | 8/2006 | Mohsenian | |
| 2006/0233260 A1* | 10/2006 | Watanabe | 375/240.24 |
| 2006/0256869 A1 | 11/2006 | Chin | |
| 2007/0009047 A1 | 1/2007 | Shim et al. | |
| 2008/0043831 A1* | 2/2008 | Sethuraman | G10L 19/173 375/240 |
| 2010/0172593 A1* | 7/2010 | Chono | H03M 7/4006 382/246 |
| 2010/0208825 A1 | 8/2010 | Chou et al. | |
| 2012/0300839 A1* | 11/2012 | Sze et al. | 375/240.12 |

FOREIGN PATENT DOCUMENTS

| | | |
|---|---|---|
| JP | 2007158430 | 6/2007 |
| JP | 2009038746 | 2/2009 |
| JP | 2009213078 | 9/2009 |
| JP | 2012023715 A | 2/2012 |
| KR | 20100104220 | 9/2010 |
| WO | 2007129433 A1 | 11/2007 |
| WO | 2008123254 A1 | 10/2008 |
| WO | 2009094349 A1 | 7/2009 |

OTHER PUBLICATIONS

"Impress Standard Textbook Series, Revised Third Version of H.264/AVC Textbook", Edited by Sakae Okubo, First Edition, Jan. 1, 2009, Impress R&D, p. 91, ISBN: 978-4-8443-2664-9.

First Office Action received for CA application 2870318 dated Jan. 15, 2016.

First Office Action received for JP application 2015-511692 dated Dec. 12, 2015.

Extended European Search Report dated Dec. 14, 2015 for Application No. 13787699.1.

Marpe, et al., "Context-Based Adaptive Binary Arithmetic Coding in the H.264/AVC Video Compression Standard", IEEE Transactions on Circuits and Systems for Video Technology, vol. 13, No. 7, Jul. 2003, 17 pages.

* cited by examiner

APPARATUSES AND METHODS FOR ESTIMATING BITSTREAM BIT COUNTS

TECHNICAL FIELD

Embodiments described relate to video encoding, and in particular to estimating bit counts of a bitstream.

BACKGROUND

Typically, signals, such as audio or video signals, may be provided as variable bit rate (VBR) or constant bit rate (CBR) bitstreams. CBR bitstreams are particularly common in many broadcasting applications as the constant bit rate allows for predictable consumption of bandwidth in one or more channels. While quality of the provided signal may vary, for example in video scenes where a lot of motion is present, this variation has been deemed acceptable in light of the advantages of maintaining a relatively steady bit rate. As CBR bitstreams are often used for streaming applications that require real-time rate control, encoders employing CBR methods often must use predictive and/or recursive methods to ensure that provided bitstreams remain within desired rate limitations.

Several methods have been utilized to provide a bitstream at a targeted bit rate. Bitstuffing, for example, has been used to ensure that a bitstream maintains a constant bit rate. This involves inserting data unrelated to a video signal into the bitstream. Once received, the stuffing data may be removed to recover the video signal. Rate-distortion optimization is another technique that has been used to maintain a constant bit rate. By selecting a particular quantization parameter, the amount of loss of signal quality incurred when quantizing coefficients of a residual may be controlled such that the bit rate may be controlled.

DETAILED DESCRIPTION

Examples of methods and apparatuses for estimating bit counts of a bitstream are described herein. Certain details are set forth below to provide a sufficient understanding of embodiments of the invention. However, it will be clear to one having skill in the art that embodiments of the invention may be practiced without these particular details, or with additional or different details. Moreover, the particular embodiments of the present invention described herein are provided by way of example and should not be used to limit the scope of the invention to these particular embodiments. In other instances, well-known video components, encoder or decoder components, circuits, control signals, timing protocols, and software operations have not been shown in detail in order to avoid unnecessarily obscuring the invention.

As known, under the H.264 standard, CABAC encoding employs several processes including binarization, context modeling, and binary arithmetic encoding. Binarization, for example, specifies that all non-binary valued syntax elements be uniquely mapped to sequences of binary decisions (e.g., bins); binary valued syntax elements are bypassed. Context modeling may then assign a context to each bin based on state transition logic. The context may comprise a state (e.g., probability index) and a most probable symbol (MPS). Each bin, after having been assigned a context, may be provided to a binary arithmetic encoder, where each bin may be arithmetically encoded according to the state and/or MPS of the bin. After the bin is encoded, the context corresponding to the bin may be updated to reflect current probability estimation. For example, binary arithmetic encoding may use a number of state variables to encode each bin. Because each of these variables is updated after each bin is arithmetically encoded, bins must usually be encoded serially. Thus the length of time required to encode using CABAC encoding is proportional to the number of bins generated during binarization. As binary arithmetic encoding can be computationally demanding, having to encode bins serially may cause encoding techniques that employ arithmetic encoding (e.g., CABAC) to be impractical for real-time applications.

Figure 1:
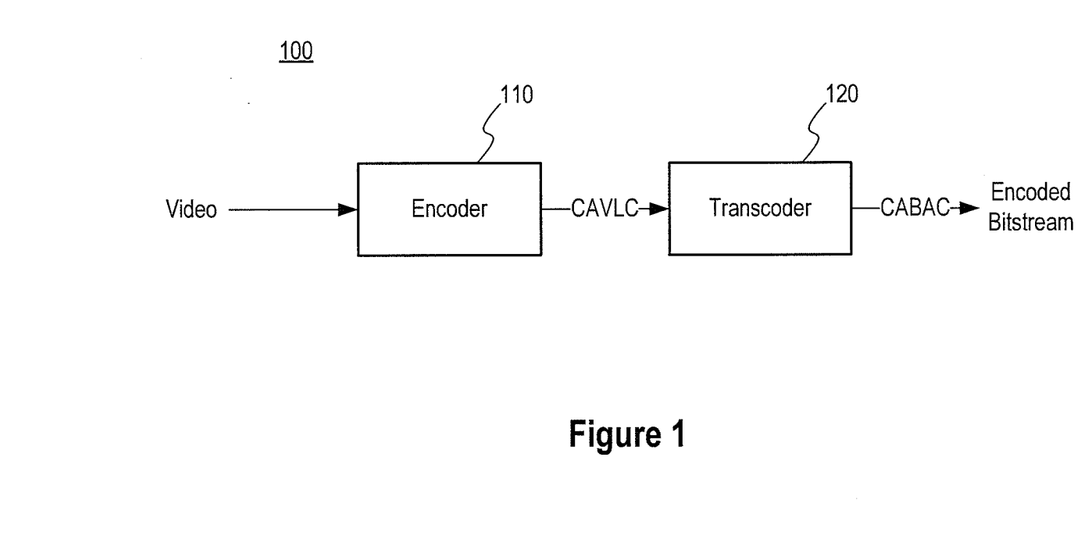
FIG. 1 is a block diagram of an encoder according to an embodiment of the invention.

FIG. 1 is a schematic block diagram of an encoder 100 according to an embodiment of the invention. The encoder 100 may be implemented in any of a variety of devices employing video encoding, including but not limited to, televisions, broadcast systems, mobile devices, and both laptop and desktop computers. The encoder 100 may include a macroblock encoder 110 and a transcoder 120. The macroblock encoder 110 may be coupled to the transcoder 120 and may receive a signal, such as a video signal that, in one embodiment, may comprise video data (e.g., frames). Generally, the macroblock encoder 110 may operate to provide a bitstream that may be generated in a rate-independent manner. The transcoder 120 may then convert the bitstream into an arithmetically coded stream format in real-time, in this manner providing a constant bit rate bitstream.

The macroblock encoder 110 may include one or more logic circuits, control logic, logic gates, processors, memory, and/or any combination or sub-combination of the same, and may be configured to encode and/or compress a video signal using one or more encoding techniques, examples of which will be described further below. The macroblock encoder 110 may be compliant with the H.264 and/or H.HEVC coding standards, and may further encode a variable bit rate signal and/or a constant bit rate signal. In at least one embodiment, the macroblock encoder 110 may include an entropy encoder, such as a context-adaptive variable-length coding (CAVLC) encoder, and/or may encode data, for instance, at a macroblock level. Each macroblock may be encoded in intra-coded mode, inter-coded mode, bidirectionally, or in any combination or sub-combination of the same. Accordingly, the macroblock encoder 110 may operate at a fixed rate and may provide an encoded bitstream to the transcoder 120.

The transcoder 120 may comprise any transcoder in the art, known now or in the future, and may transcode a bitstream encoded with a first encoding technique to a bitstream encoded with a second encoding technique. The transcoder 120 may, for instance, convert (e.g., transcode) a bitstream having a reorderable format to a bitstream having a non-reorderable format. Moreover, the transcoder 120 may further receive a bitstream having a constant bit rate, and/or may transcode in real-time.

In an example operation of the apparatus 100, the macroblock encoder 110 may receive and encode a video signal in accordance with one or more encoding techniques to provide an encoded bitstream. The encoded bitstream may be provided to the transcoder 120, which may subsequently provide (e.g., generate) a transcoded bitstream based, at least in part, on the encoded bitstream. The transcoded bitstream may be provided, for example, to a data bus and/or to a device, such as a decoder (not shown). As will be explained in more detail below, the macroblock encoder 110 may generate macroblocks based on a video signal and encode the macroblocks, for instance, in a reorderable format, such as CAVLC. The macroblock encoder 110 may further estimate the bit count of encoding the macroblocks, for instance, using a non-reorderable format, such as CABAC. In one embodiment, this estimated bit count may be used to ensure that in encoding the video signal with the encoder 100, the transcoded bitstream is provided from the transcoder 120 at a desired bit rate. In at least one embodiment, the desired bit rate may be predetermined and/or adjusted dynamically.

Figure 2:
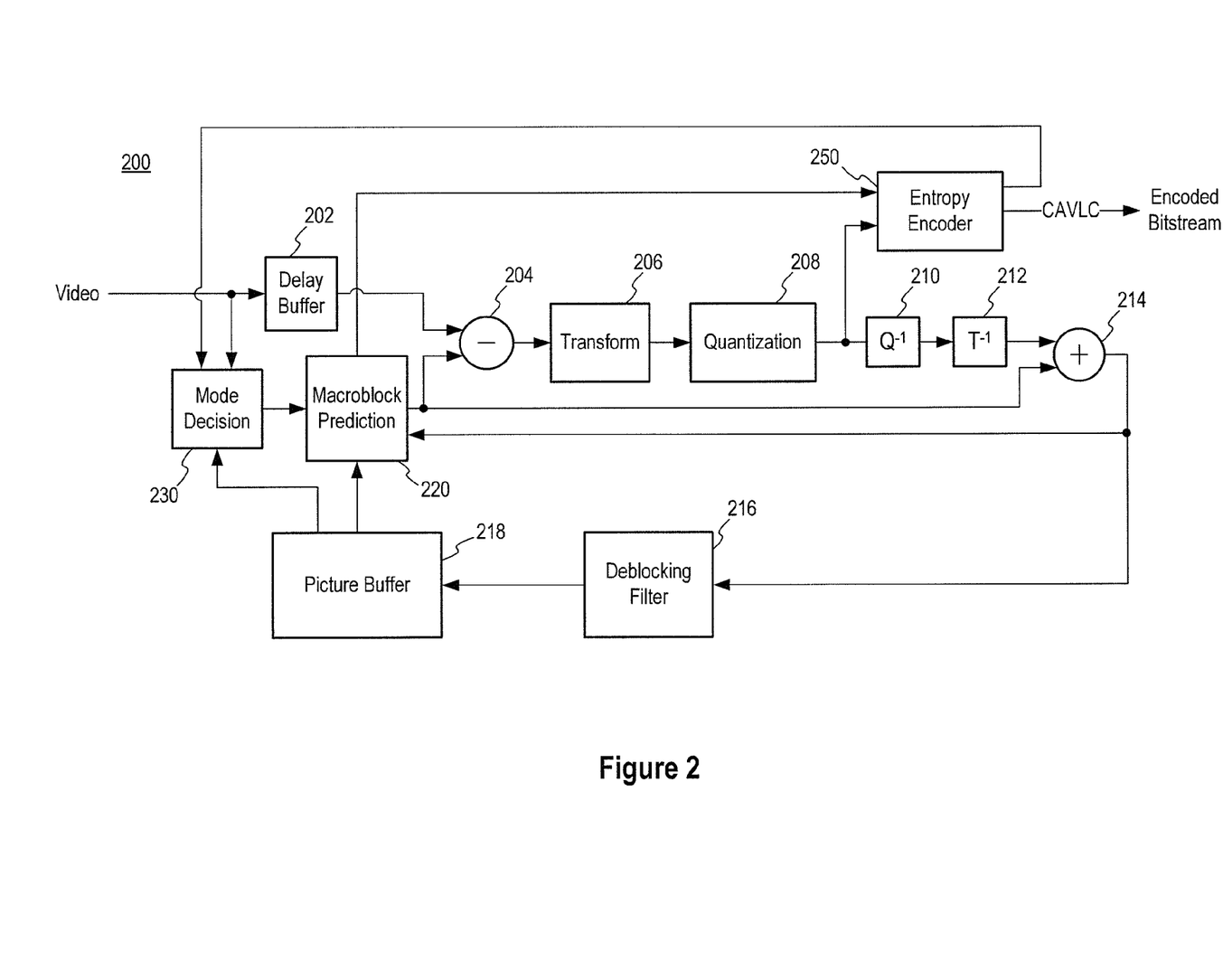
FIG. 2 is a schematic block diagram of a macroblock encoder that may be used in the encoder of FIG. 1 according to an embodiment of the invention.

FIG. 2 is a schematic block diagram of a macroblock encoder 200 according to an embodiment of the invention. The macroblock encoder 200 may be used to implement the macroblock encoder 110 of FIG. 1, and may be compliant with one or more encoding standards in the art, known now or in the future. The macroblock encoder 200 may be operated in semiconductor technology, and may be implemented in hardware, software, or combinations thereof.

The macroblock encoder 200 may include an encoding path having a mode decision module 230, a delay buffer 202, a transform 206, a quantizer 208, and an entropy encoder 250. As known, the mode decision module 230 may determine an appropriate coding mode, for instance, on a per frame, slice, and/or macroblock basis. The mode decision module 230 may, for instance, include intra modes, inter modes, differential motion vectors, and/or quantization parameters. In some examples of the present invention, the mode decision module 230 may receive estimated bit counts from the entropy encoder 250, and may further utilize the bit counts in making mode decisions during encoding of a video signal, as described further below.

The output of the mode decision module 230 may be utilized by a prediction module 220 to generate a predictor in accordance with H.264 normative methods, or other prediction techniques. The predictor may be subtracted from a delayed version of the video signal at the subtractor 204. Using the delayed version of the video signal may provide time for the mode decision block 230 to act. The output of the subtractor 204 may be a residual, e.g. the difference between a block and a predicted block.

The transform 206 may be configured to perform a transform, such as a discrete cosine transform (DCT), on the residual to produce a block of coefficients that may, for instance, correspond to spectral components of data in the video signal. Generally, the transform 206 may transform the residual to a frequency domain representation of the residual referred to as a coefficient block. The quantizer 208 may be configured to receive the coefficient block and quantize coefficients of the coefficient block to produce a quantized coefficient block. Quantization of the coefficients may be lossy, but may optimize rate-distortion costs using, for instance, a Lagrangian multiplier provided by the mode decision block 230. In turn, the entropy encoder 250 may encode the quantized coefficient block to provide an encoded bitstream. The entropy encoder 250 may be any entropy encoder known by those having ordinary skill in the art, such as a CAVLC encoder.

The entropy encoder 250 may encode the quantized coefficients with an encoding technique, such as CAVLC, and may further estimate bit counts for encoding the quantized coefficients with a different encoding technique, such as CABAC. The entropy encoder 250 may receive syntax elements (e.g., quantized coefficients, differential motion vectors, macroblock modes, etc.) from other devices of the macroblock encoder 200, such as the quantizer 208 and/or prediction module 220. The entropy encoder 250 may encode and/or estimate bit counts based on the received syntax elements. These estimated bit counts may be provided to the mode decision block 230.

As discussed, the encoder 200 may operate in accordance with the H.264 video coding standard. Thus, because the H.264 video coding standard employs motion prediction and/or compensation, the encoder 200 may further include a feedback path that includes an inverse quantizer 210, an inverse transform 212, a reconstruction adder 214, and a deblocking filter 216. These elements may mirror elements included in a decoder (not shown) that is configured to reverse, at least in part, the encoding process performed by the encoder 200. Additionally, the feedback loop of the encoder may include a decoded picture buffer 218 and the prediction block 220.

The quantized coefficients may be inverse quantized by the inverse quantizer 210 to provide recovered coefficients, and the recovered coefficients may be inverse transformed by the inverse transform 212 to produce a reconstructed residual. The reconstructed residual may be added to the predictor at the adder 214 to produce reconstructed video, which may be deblocked by the deblocking filter 216, written to the decoded picture buffer 218 for use in future frames, and fed back to the macroblock prediction module 220 for further in-macroblock intra prediction and/or other prediction operations.

In an example operation of the encoder 200, a video signal (e.g. a base band video signal) may be provided to the encoder 200. The video signal may be provided to the delay buffer 202 and the mode decision block 230. The subtractor 204 may receive the video signal from the delay buffer 202 and may subtract a motion prediction signal from the video signal to generate a residual. The residual may be provided to the transform 206 and processed using a forward transform, such as a DCT. The transform 206 may generate a coefficient block that may be provided to the quantizer 208, and the quantizer 208 may quantize the coefficient block. Quantized coefficients and other syntax elements may be provided to the entropy encoder 250 and encoded into an encoded bitstream. As described, in addition to providing an encoded bitstream, the entropy encoder may estimate bit counts for encoding the syntax elements with an encoding technique and may provide the bit count estimates to the mode decision block 230. The estimated bit counts may be used, for instance, by the mode decision block 230 to control the bit rate of the encoded bitstream.

The block of quantized coefficients may also be provided to the feedback loop of the encoder 200. That is, the block of quantized coefficients may be inverse quantized, inverse transformed, and added to the motion prediction signal by the inverse quantization block 210, the inverse transform 212, and the reconstruction adder 214, respectively, to produce a reconstructed video signal. Both the prediction block 220 and the deblocking filter 216 may receive the reconstructed video signal, and the decoded picture buffer 218 may receive a filtered video signal from the deblocking filter 216. Based, at least in part, on the reconstructed and filtered video signals, the prediction block 220 may provide a motion prediction signal to the adder 204.

Accordingly, the macroblock encoder 200 of FIG. 2 may provide an encoded bitstream based on a video signal, wherein syntax elements are encoded using an encoding technique, such as CAVLC, and further may provide estimated bit counts for encoding the syntax elements using a different encoding technique, such as CABAC. In one embodiment, the encoded bitstream may be a CAVLC bitstream provided at a fixed rate, and the rate at which the CAVLC bitstream is provided may be based on the estimated bit counts for encoding with CABAC. As previously described, the encoded bitstream may be transcoded by the transcoder 120, for example, from CAVLC to CABAC. Thus, in one embodiment, at least partly because the rate of the encoded bitstream may be controlled based on estimated bit counts, the bit rate of the transcoded bitstream provided by the transcoder 120 may be controlled based on the estimated bit counts as well.

Figure 3:
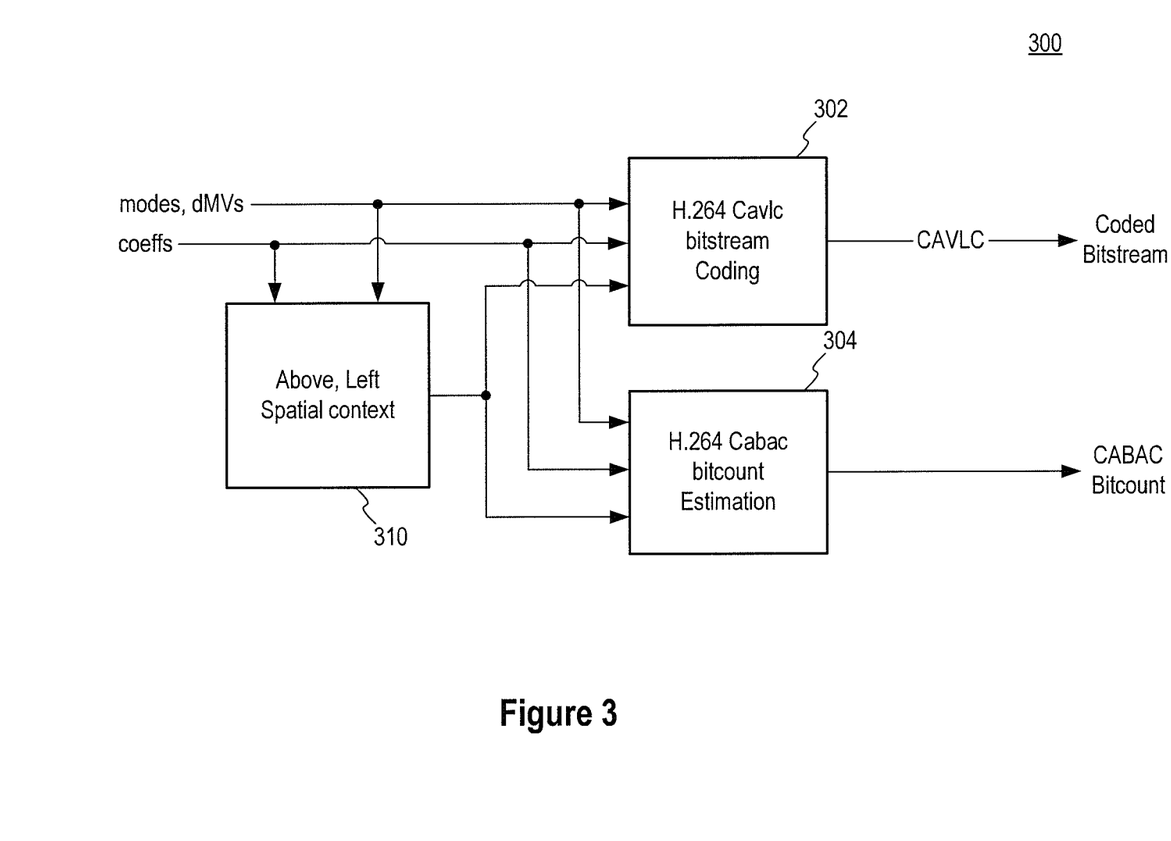
FIG. 3 is a schematic block diagram of an entropy encoder that may be used in the macroblock encoder of FIG. 2 according to an embodiment of the invention.

FIG. 3 is a schematic block diagram of an entropy encoder 300 according to an embodiment of the invention. The entropy encoder 300 may be used to implement the entropy encoder 250 of FIG. 2 and may include a bitstream encoding module 302, a bit count estimation module 304, and a spatial context module 310. The bitstream encoding module 302 may receive syntax elements (e.g., differential motion vectors, macroblock modes, quantized coefficients, etc.) and further may be coupled to the spatial context module 310. The bitstream encoding module 302 may encode the syntax elements to provide a bitstream, as described above, and in one embodiment, may provide the bitstream using a spatial context provided by the spatial context module 310. Similarly, the bit count estimation module 304 may receive syntax elements and may further be coupled to the spatial context module 310. The bit count estimation module 304 may provide bit count estimates for encoding the syntax elements, and in one embodiment may provide the bit count estimates using spatial contexts received from the spatial context module 310.

In an example operation of the entropy encoder 300, syntax elements may be provided to the bitstream encoding module 302 and the bit count estimation module 304. The bitstream encoding module 302 may receive a spatial context from the spatial context module 310 and encode the syntax elements using an encoding technique (e.g., CAVLC). The bit count estimation module 304 may also receive the spatial context from the spatial context module 310, and estimate a bit count for encoding the syntax elements using an encoding technique that may differ from the encoding technique used by the bitstream encoding module 302 (e.g., CABAC). Subsequent syntax elements may be provided to the bitstream encoding module 302 and the bit count estimation module 304 until all syntax elements generated from a video signal have been encoded and/or used to estimate bit counts.

Thus, syntax elements may be used to generate estimated bit counts which, as described with reference to FIG. 2, may be fed back to the mode decision block 230. In this manner, the bit rate of the bitstream provided by the bitstream encoding module 302 may be controlled. As described, by controlling the bit rate of the encoded bitstream, the bit rate of a transcoded bitstream based on the encoded bitstream may be controlled as well.

Figure 4:
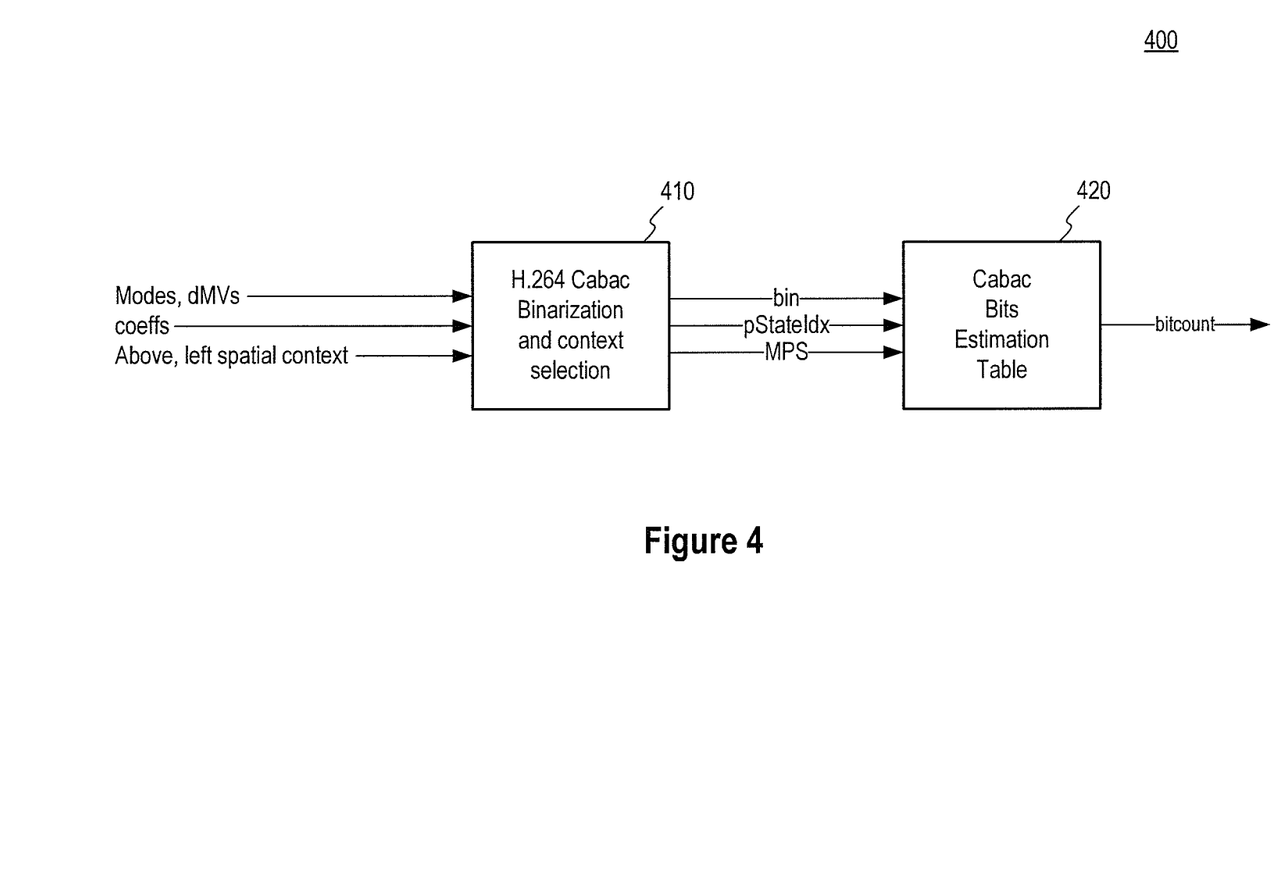
FIG. 4 is a schematic diagram of a bit count module that may be used in the entropy encoder of FIG. 3 according to an embodiment of the invention.

FIG. 4 is a schematic diagram of a bit count estimation module 400 according to an embodiment of the invention. The bit count estimation module 400 may be used to implement the bit count estimation module 304 of FIG. 3 and may include a binarization and context module 410 and an estimation module 420. The binarization and context module 410 may be coupled to the estimation module 420 and may sequentially receive syntax elements and spatial contexts, as described above. In accordance with the H.264 coding standard, the binarization and context module 410 may binarize non-binary valued syntax elements and bypass binary valued syntax elements to provide a plurality of bins. The binarization and context module 410 may further assign each bin a context (e.g., CABAC context) including a state and an MPS. In one embodiment, contexts may be stored in the binarization and context module 410, and in another embodiment, contexts may be stored in a separate device (not shown), such as a memory (not shown), and provided to the binarization and context module 410. The estimation module 420 may receive each bin, state, and MPS, and may provide an estimated bit count for encoding a bin in accordance with a coding standard, such as CABAC. In one embodiment, the estimation module may use estimation tables to provide estimated bit counts. The estimation tables may, for instance, be included in the estimation module 420, and may include values based on particular arithmetic encoding (e.g, CABAC) algorithms. In at least one embodiment, the values may be based on methodologies used to determine whether a bin matches its corresponding MPS. The estimation module 420 may further sum estimated bit counts associated with each bin and provide a total bit count for encoding, for example, a macroblock. In some embodiments, the estimation module 420 may additionally, or alternatively, provide bit counts for encoding a block, slice, and/or a frame.

Thus, the bit count estimation module 400 may estimate bit rates for encoding with a coding standard, such as CABAC, without utilizing arithmetic encoding. Instead, the bit count estimation module 400 may estimate using estimation tables stored in the estimation module 420. The estimated bit counts may be summed, and as described with reference to FIG. 2, may be provided to the mode decision block 230. The estimated bit rates may be used to control the bit rate of a bitstream provided by an entropy encoder, such as the entropy encoder 300 of FIG. 3.

Figure 5:
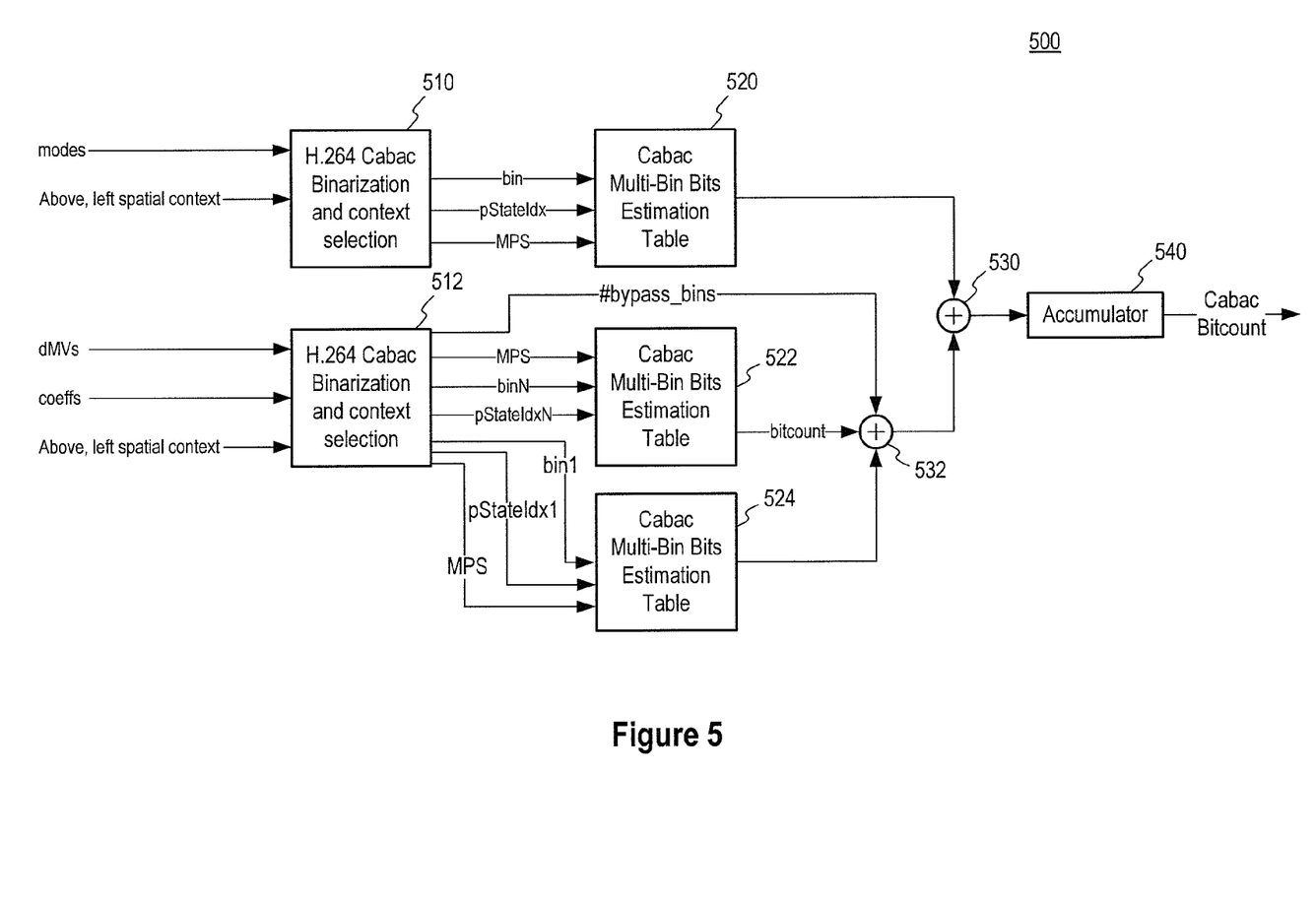
FIG. 5 is a schematic diagram of a bit count module that may be used in the entropy encoder of FIG. 3 according to an embodiment of the invention.

FIG. 5 is a schematic diagram of a bit count estimation module 500 according to an embodiment of the invention. The bit count estimation module 500 may be used to implement the bit count estimation module 304 of FIG. 3 and may comprise binarization and context modules 510, 512, and estimation modules 520, 522, 524. The binarization and context modules 510, 512 may be similar to the binarization and context module 410 of FIG. 4, and the estimation modules 520, 522, 524 may be similar to the estimation module 420 of FIG. 4. The bit count estimation module 500 may further include adders 530, 532 and an accumulator 540. The binarization and context modules 510, 512 may receive respective syntax elements and a spatial context, for example, from the spatial context module 310 of FIG. 3. Each of the binarization and context modules 510, 512 may binarize received syntax elements to generate respective pluralities of bins, and may assign each of the bins a context, as described above. Based on each bin, state, and MPS, respective estimated bit counts may be provided by the estimation modules 520, 522, 524. The estimated bit counts may be combined by the adders 530 and 532 and provided to the accumulator 540, as indicated in FIG. 5. The accumulator 540 may store and/or sum received bit counts until a total bit count, for instance, of a macroblock, has been estimated. The total bit count may be provided to a mode decision module, such as the mode decision module 230 of FIG. 2, as described above.

In one embodiment, such as that illustrated in FIG. 5, the binarization and context module 510 may receive syntax elements comprising macroblock modes and the binarization and context module 512 may receive syntax elements comprising differential motion vectors and quantized coefficients. Each binarization and context module 510, 512 may provide bins, states, and most probable symbols to respective estimation modules, such as the estimation modules 520, 522, 524. This may allow, for instance, bit counts to be estimated in parallel. In some examples, estimation modules 520, 522, and 524 may estimate bit counts simultaneously, or at least partially simultaneously, allowing a bit count of a macroblock to be estimated in less time than if a bit count for each syntax element was estimated serially.

For example, because the binarization and context module 512 may receive differential motion vector and quantized coefficient syntax elements, some of these syntax elements may be binary valued and therefore bypassed to the adder 532. Moreover, one or more bins generated from a syntax element may be provided to estimation module 524, and the remaining bins of the syntax element may be provided to estimation module 522. In one embodiment, the binarization and context module 512 may provide be configured to provide bins to estimation modules based on the contexts assigned to the bins. For example, if two bins are assigned a different context, the binarization and context module may provide each bin to a respective estimation module.

In other embodiments, the bit count estimation module 500 may include additional binarization and context modules (not shown) that may receive respective syntax elements. As an example, macroblock modes, differential motion vectors, and quantized coefficients may each be provided to respective binarization and context modules. Moreover, as described, the binarization and context module 512 may provide a first bin of a syntax element to the estimation module 524 and provide the remaining bins to the estimation table 522. In some embodiments, however, estimation of bit counts for each bin may be further parallelized. That is, the bit count estimation module 500 may comprise additional estimation modules (not shown). For example, a binarization and context module, such as the binarization and context module 512, may be configured to provide a first bin, state, and MPS to a first estimation module, a second bin, state, and MPS to a second estimation module, and remaining bins, states, and most probable symbols to a third estimation module. Any number of binarization and context modules and/or estimation modules may be used in the bit count estimation module 500 such that any number of bins and/or bit counts may be generated and/or estimated in parallel, respectively.

Because the bit count estimation module 500 may comprise any number of binarization and context modules and/or estimation modules arranged in parallel, the amount of time needed to estimate a bit rate, for instance, of a macroblock, may be reduced. With reference to FIG. 3, in one embodiment, the bit count estimation module 500 may estimate bit rates for encoding with CABAC at a same or higher rate than the rate at which the bitstream encoding module 302 encodes a macroblock with CAVLC. This may allow an encoder, such as the encoder 100 of FIG. 1, to operate in real-time.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An apparatus comprising:
an encoder circuit configured to encode a plurality of syntax elements according to a first entropy encoding technique to generate an encoded bitstream;
an estimator circuit configured to generate an estimated bit count corresponding to the syntax elements (i) as if the syntax elements were encoded with a second entropy encoding technique and (ii) based solely on the syntax elements, wherein the generation of the estimated bit count includes (a) generating first information in response to modes and a spatial context, (b) generating second information and third information in response to the syntax elements and the spatial context, (c) reading a plurality of intermediate counts from a plurality of lookup tables based on the first information, the second information and the third information and (d) summing the intermediate counts to generate the estimated bit count;
a mode decision circuit configured to adjust the encoding of the syntax elements according to the first entropy encoding technique in response to the estimated bit count; and
a transcoder circuit (i) coupled to the encoder circuit and (ii) configured to generate a transcoded bitstream according to the second entropy encoding technique by transcoding the encoded bitstream, wherein an actual bit rate of the transcoded bitstream is controlled based on the estimated bit count.

2. The apparatus according to claim 1, wherein (i) the first entropy encoding technique comprises a reorderable format and (ii) the second entropy encoding technique comprises a non-reorderable format.

3. The apparatus according to claim 2, wherein (i) the reorderable format comprises CAVLC and (ii) the non-reorderable format comprises CABAC.

4. The apparatus according to claim 1, wherein the estimator circuit is further configured to generate (i) a first portion of the estimated bit count of a first of the syntax elements and (ii) a second portion of the estimated bit count of a second of the syntax elements in parallel.

5. The apparatus according to claim 1, wherein the encoded bitstream is based on the spatial context.

6. The apparatus according to claim 1, wherein a bit rate of a later encoded bitstream is based on the estimated bit count.

7. An apparatus comprising:
an encoder circuit configured to (i) generate a plurality of syntax elements from a video signal, (ii) generate an encoded bitstream in accordance with a first entropy encoding technique by encoding the syntax elements and (iii) generate an estimated bit count corresponding to the syntax elements (a) as if the syntax elements where encoded in accordance with a second entropy encoding technique and (b) based solely the syntax elements, wherein the generation of the estimated bit count includes (a) generating first information in response to modes and a spatial context, (b) generating second information and third information in response to the syntax elements and the spatial context, (c) reading a plurality of intermediate counts from a plurality of lookup tables based on the first information, the second information and the third information and (d) summing the intermediate counts to generate the estimated bit count; and a transcoder circuit (i) coupled to the encoder circuit and configured to (ii) generate a transcoded bitstream according to the second entropy encoding technique by transcoding the encoded bitstream, wherein an actual bit rate of the transcoded bitstream is controlled based on the estimated bit count.

8. The apparatus according to claim 7, wherein the encoder circuit is further configured to generate (i) a first portion of the estimated bit count from a first of the syntax elements and (ii) a second portion of the estimated bit count from a second of the syntax elements in parallel.

9. The apparatus according to claim 8, wherein the encoder circuit is further configured to (i) generate a first plurality of bins based on the first syntax element, and (ii) generate a second plurality of bins based on the second syntax element.

10. The apparatus according to claim 7, wherein the estimated bit count comprises an estimate of bits where a macroblock is encoded with the second entropy encoding technique.

11. The apparatus according to claim 7, wherein the encoder circuit is configured to update the estimated bit count in real-time.

12. The apparatus according to claim 7, wherein the encoder circuit is further configured to make one or more mode decisions based on the estimated bit count.

13. An encoding method, comprising the steps of:
encoding in a circuit a plurality of syntax elements according to a first entropy encoding technique to generate an encoded bitstream;
generating an estimated bit count corresponding to the syntax elements (i) as if the syntax elements were encoded with a second entropy encoding technique and (ii) based solely on the syntax elements, wherein the generation of the estimated bit count includes (a) generating first information in response to modes and a spatial context, (b) generating second information and third information in response to the syntax elements and the spatial context, (c) reading a plurality of intermediate counts from a plurality of lookup tables based on the first information, the second information and the third information and (d) summing the intermediate counts to generate the estimated bit count;

adjusting the encoding of the syntax elements according to the first entropy encoding technique in response to the estimated bit count; and
generating a transcoded bitstream by transcoding the encoded bitstream according to the second entropy encoding technique, wherein an actual bit rate of the transcoded bitstream is controlled based on the estimated bit count.

14. The method according to claim 13, wherein (i) the first entropy encoding technique is CAVLC and (ii) the second entropy encoding technique is CABAC.

15. The method according to claim 13, wherein
(i) the generation of the estimated bit count comprises:
estimating a first bit count of a first bin; and
estimating the bit count of a second bin, and
(ii) the first bin and the second bin correspond to a same CABAC context.

16. The method according to claim 13, wherein the generation of the estimated bit count comprises:
estimating a first portion of the estimated bit count with a first estimation module; and
estimating a second portion of the estimated bit count with a second estimation module.

17. The method according to claim 16, wherein (i) the first portion corresponds to a macroblock mode, and (ii) the second portion corresponds to at least one of (a) a differential motion vector or (b) a quantized coefficient.

18. The method according to claim 13, further comprising the step of:
compressing a video signal to generate the syntax elements.

19. The method according to claim 13, wherein the generation of the estimated bit count as if the syntax elements were encoded with the second entropy encoding technique comprises:
generating all of (i) a plurality of bins per the second entropy encoding technique, (ii) a plurality of states per the second entropy encoding technique and (iii) a plurality of most probable symbols per the second entropy encoding technique in response to the syntax elements.

20. The method according to claim 19, wherein the estimated bit count is generated by a table lookup based on all of (i) the bins, (ii) the states and (iii) the most probably symbols.

* * * * *